(12) United States Patent
Oda et al.

(10) Patent No.: US 12,323,188 B2
(45) Date of Patent: Jun. 3, 2025

(54) OPTICAL TRANSCEIVER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Toshihiro Oda, Nisshin (JP); Yuki Kamata, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 120 days.

(21) Appl. No.: 18/187,307

(22) Filed: Mar. 21, 2023

(65) Prior Publication Data

US 2023/0388018 A1 Nov. 30, 2023

(30) Foreign Application Priority Data

May 25, 2022 (JP) ................ 2022-085299

(51) Int. Cl.
*H04B 10/40* (2013.01)
*H04B 10/25* (2013.01)
*H04B 10/50* (2013.01)
*H04B 10/572* (2013.01)

(52) U.S. Cl.
CPC ....... *H04B 10/40* (2013.01); *H04B 10/25891* (2020.05); *H04B 10/506* (2013.01); *H04B 10/572* (2013.01)

(58) Field of Classification Search
CPC .... H04B 10/40; H04B 10/506; H04B 10/572; H04B 1/40; H04B 10/25891
USPC ......................................................... 398/135
See application file for complete search history.

(56) References Cited

U.S. PATENT DOCUMENTS

| | | | | |
|---|---|---|---|---|
| 8,885,675 | B2 * | 11/2014 | Yamazaki ............. | H01S 5/0687 372/50.1 |
| 10,608,773 | B2 * | 3/2020 | Huang .............. | H04J 14/02216 |
| 11,617,029 | B2 * | 3/2023 | Leigh ................... | G02B 6/3554 398/45 |
| 2010/0284649 | A1 | 11/2010 | Ishii | |
| 2014/0328590 | A1 | 11/2014 | Brenot et al. | |
| 2016/0336718 | A1 * | 11/2016 | Takabayashi ......... | H01S 5/0078 |
| 2017/0098921 | A1 * | 4/2017 | Takabayashi ......... | H01S 5/1071 |
| 2017/0179671 | A1 * | 6/2017 | Takabayashi ......... | H01S 5/1032 |
| 2018/0306925 | A1 | 10/2018 | Hosseini et al. | |
| 2019/0204419 | A1 * | 7/2019 | Baba ....................... | G02B 6/124 |
| 2019/0229808 | A1 * | 7/2019 | Calhoun ............ | H01Q 21/0006 |
| 2020/0088876 | A1 * | 3/2020 | Tanemura ............... | G01S 7/006 |

(Continued)

FOREIGN PATENT DOCUMENTS

| | | |
|---|---|---|
| JP | 5408539 B2 | 2/2014 |
| JP | 2018-141821 A | 9/2018 |
| WO | WO-2013145271 A1 * 10/2013 | ......... G02B 6/12004 |

*Primary Examiner* — Abbas H Alagheband
(74) *Attorney, Agent, or Firm* — Posz Law Group, PLC

(57) ABSTRACT

An optical transceiver includes a plurality of light sources having a ring resonator, a reception antenna to receive light, and a wavelength-separating filter to separate, from the light received by the reception antenna, light of a same wavelength as the light output from a part of the plurality of light sources. The wavelength-separating filter is composed of the ring resonator included in the light source.

3 Claims, 9 Drawing Sheets

(56) References Cited

U.S. PATENT DOCUMENTS

| | | | |
|---|---|---|---|
| 2020/0144782 A1* | 5/2020 | Oda | H04B 10/503 |
| 2020/0301071 A1* | 9/2020 | Nagarajan | G02B 6/428 |
| 2020/0336210 A1* | 10/2020 | Khatibzadeh | H04B 10/501 |
| 2021/0318442 A1 | 10/2021 | Hosseini et al. | |
| 2021/0373350 A1 | 12/2021 | Oda et al. | |

* cited by examiner

OPTICAL TRANSCEIVER

CROSS REFERENCE TO RELATED APPLICATION

The present application is based on Japanese Patent Application No. 2022-085299 filed on May 25, 2022. The entire disclosures of all of the above applications are incorporated herein by reference.

TECHNICAL FIELD

The present disclosure relates to an optical transceiver.

BACKGROUND

Conventionally, an optical deflection device has been used as a beam deflection system.

SUMMARY

An optical transceiver according to an aspect of the present disclosure includes: a plurality of light sources having a ring resonator; a reception antenna configured to receive light; and a wavelength-separating filter configured to separate, from the light received by the reception antenna, light having a same wavelength as the light output from a part of the plurality of light sources. The wavelength-separating filter is composed of the ring resonator of the part of the plurality of light sources.

BRIEF DESCRIPTION OF THE DRAWINGS

The above and other objects, features and advantages of the present disclosure become more apparent from the following detailed description made with reference to the accompanying drawings. In the drawings:

FIG. 2 is an explanatory diagram of dimensions and the like of each part such as a waveguide, a ring resonator and the like;

DETAILED DESCRIPTION

Figure 1:
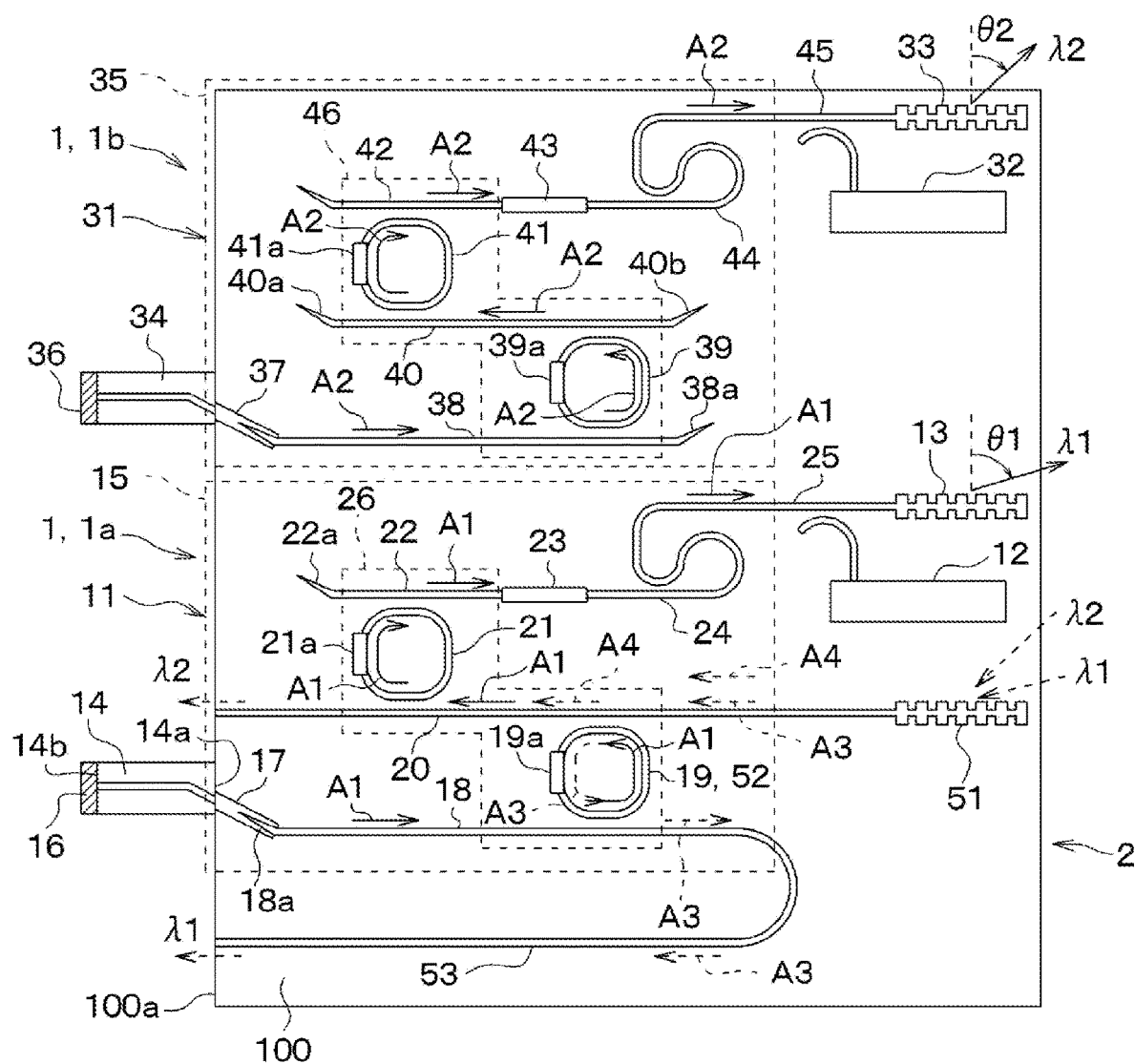
FIG. 1 is a diagram showing a schematic configuration of an optical transceiver according to a first embodiment.

An example of the present disclosure is described below.

As a beam deflection system, there is an optical deflection device. An example of the optical deflection device of the present disclosure is configured to simultaneously scan a plurality of scanning ranges using a plurality of wavelength-tunable laser light sources. Because a single laser beam cannot cover a wide scanning range due to restrictions on the wavelength tunable range of the wavelength-tunable laser light source, this optical deflection device is provided with a plurality of laser light sources to cover the entire scanning range. Specifically, by introducing laser beams output from a plurality of laser light sources with different wavelengths into a beam polarizer and causing an emitter to emit light at an output angle corresponding to each wavelength, multiple scanning ranges are simultaneously scannable. A wavelength-separating filter is provided for the processing of the received light, and by controlling the transmission characteristics of the wavelength-separating filter in accordance with the wavelength of the laser light source, the received lights of different wavelengths are separately and detected.

In the optical deflection device of one example of the present disclosure, the laser light source and the wavelength-separating filter are separate devices. Therefore, it is necessary to control a transmission wavelength of the wavelength-separating filter separately from the control of the wavelength of the laser light source, and the time required for controlling the wavelength of the optical deflection device as a whole becomes long.

An optical transceiver according to an example of the present disclosure, comprised a plurality of light sources having a ring resonator, a reception antenna configured to receive light, and a wavelength-separating filter configured to separate, from among the light received by the reception antenna, light having the same wavelength as the light output from a part of the plurality of light sources. The wavelength-separating filter is composed of a ring resonator of the part of the light sources.

According to the above, since the wavelength-separating filter is configured by the ring resonator of the light source, the transmission wavelength of the wavelength-separating filter is also controlled by controlling the wavelength of the output light. Therefore, there is no need to separately control the transmission wavelength of the wavelength-separating filter, and the time required for wavelength control is reducible.

Hereinbelow, embodiments of the present disclosure are described with reference to the drawings. In each of the following embodiments, the same or equivalent parts are denoted by the same reference numerals.

First Embodiment

The following describes the first embodiment. The optical transceiver of the present embodiment is applied to, for example, laser radar, FMCW (Frequency Modulated Continuous Wave) type LiDAR (Light Detection And Ranging), and the like.

As shown in FIG. 1, the optical transceiver includes a transmitter 1 that transmits light to the outside and a receiver 2 that receives light from the outside. The optical transceiver includes a plurality of transmitters 1. In the present embodiment, the configuration where the optical transceiver includes two transmitters 1 is described. The two transmitters 1 are referred to as a transmitter 1a and a transmitter 1b, respectively.

The transmitter 1a includes an external resonance laser 11 as a light source, a wavelength monitor 12 and a transmission antenna 13. The external resonance laser 11 includes an SOA (Semiconductor Optical Amplifier) 14 and an external resonator 15. The wavelength monitor 12, the transmission antenna 13 and the external resonator 15 are formed by subjecting a semiconductor substrate 100 to semiconductor processing, and the SOA 14 is connected to the semiconductor substrate 100. The external resonance laser 11 is configured to emit internally-emitted light from the SOA 14 to the external resonator 15, extract the light as intense light in a resonant state in the external resonator 15 and the SOA 14, and output the light as externally-emitted light.

The SOA 14 amplifies and outputs light, and is composed of, for example, a III-V group semiconductor structure and the like. The SOA 14 is integrally connected to the external resonator 15 by attaching one surface 14a to an end surface 100a of the semiconductor substrate 100. The SOA 14 is connected, with the one surface 14a, to the end surface 100a via a matching oil, ultraviolet curable resin, or the like (not shown) to be optically coupled with a waveguide 18, which will be described later.

A total reflection mirror 16 is provided on the other surface 14b of the SOA 14. The total reflection mirror 16 serves to reflect the internally-emitted light of the SOA 14 and returning the light toward the external resonator 15. The SOA 14 is provided with electrodes (not shown) and the like, thereby capable of changing the light output based on the current injected from the electrodes.

The external resonator 15 includes an SSC (Spot Size Converter) 17, the waveguide 18, a ring resonator 19, a waveguide 20, a ring resonator 21, a waveguide 22, a frequency modulator 23, and a semi-reflective mirror 24 and a waveguide 25.

The SSC 17 is used for matching mode diameters of the SOA 14 and the waveguide 18. One end of the SSC 17 is exposed from the end surface 100a of the semiconductor substrate 100 and the other end of the SSC 17 is connected to the waveguide 18. For example, the SSC 17 has a mode diameter that gradually expands from the waveguide 18 toward the SOA 14. The other end of the SSC 17 close to the waveguide 18 is inclined at a predetermined angle with respect to the longitudinal direction of the waveguide 18 to prevent reflection.

The waveguide 18 propagates the internally-emitted light transmitted from the SSC 17 to the ring resonator 19, and propagates the internally-emitted light returning from the ring resonator 19 toward the SOA 14. The waveguide 18 has a line shape in one direction along a longitudinal direction. An end portion of the waveguide 18 connected to the SSC 17 extends in a direction inclined at a predetermined angle with respect to the longitudinal direction of the waveguide 18. This end portion is connected to the SSC 17 including a tapered waveguide 18a, thereby suppressing reflection and efficiently propagating the light toward the SSC 17. The other end portion of the waveguide 18 opposite to the SSC 17 is connected to a waveguide 53 which will be described later. The waveguide 20 is formed in a line shape parallel to the waveguide 18, and the ring resonator 19 is arranged at a position between the waveguide 18 and the waveguide 20.

The ring resonator 19 is a resonator that generates a transmission spectrum having a predetermined FSR (Free Spectral Range) when light is input. The ring resonator 19 is arranged at a predetermined distance from the waveguides 18 and 20, and is optically coupled to the waveguides 18 and 20. Therefore, when the internally-emitted light is propagated from the waveguide 18, the internally-emitted light is propagated to the ring resonator 19, and the light propagated inside the ring resonator 19 is propagated to the waveguide 20.

The waveguide 20 propagates the internally-emitted light transmitted from the ring resonator 19 to the ring resonator 21, and propagates the internally-emitted light returning from the ring resonator 21 to the ring resonator 19. One end of the waveguide 20 extends to the end surface 100a of the semiconductor substrate 100, and the other end is connected to a reception antenna 51, which will be described later. The ring resonator 19 and the ring resonator 21 are arranged such that the ring resonator 19 is closer to the reception antenna 51 than the ring resonator 21. The waveguide 22 is formed in a line shape parallel to the waveguides 18 and 20, and the ring resonator 21 is arranged at a position between the waveguides 20 and 22. Note that the waveguides 18, 20, 22 are not necessarily in parallel with each other, and the waveguides 20, 22 may be inclined with respect to the waveguide 18, for example.

The ring resonator 21 is a resonator that generates a transmission spectrum having a predetermined FSR when light is input. The ring resonator 21 is arranged at a predetermined distance from the waveguides 20 and 22, but is optically coupled to the waveguides 20 and 22. Therefore, when the internally-emitted light is propagated from the waveguide 20, the internally-emitted light is propagated to the ring resonator 21, and the light propagated into the ring resonator 21 is then propagated to the waveguide 22.

Although the transmission spectrum of the ring resonator 21 has a different FSR from the ring resonator 19, both of the ring resonator 19 and the ring resonator 21 have peaks of the transmission spectrum at a predetermined wavelength. This wavelength is $\lambda 1$. At such wavelength $\lambda 1$, the transmission spectra generated by the ring resonators 19 and 21 are overlapped, and a transmission spectrum of the double ring, which is a composite spectrum of the transmission spectra, becomes the first peak highest among the peaks. Due to this first peak, the longitudinal mode of the Fabry-Perot resonator formed between the total reflection mirror 16 and the semi-reflective mirror 24 is selected, laser oscillation occurs, and intense light is output. Note that the ring resonator 19 and the ring resonator 21 are configured to block light of a wavelength $\lambda 2$, which will be described later. That is, more specifically, the transmittance of light having the wavelength $\lambda 2$ is configured to be less than or equal to a predetermined value.

The ring resonator 19 and the ring resonator 21 are provided with a heater 19a and a heater 21a, respectively. Heating by the heater 19a and the heater 21a allows intentional change of the FSR of the transmission spectrum. Thus, the ring resonator 19, the waveguide 20 and the ring resonator 21 constitute a wavelength tunable filter 26.

Details of each part of the waveguide 18, the ring resonator 19, and the waveguide 20 are described with reference to FIGS. 2 and 3. Here, an example of the dimensions of each part of the ring resonator 19 and the waveguides 18 and 20 arranged on both sides thereof is described. The same applies, with a few exceptions, to the ring resonator 21 and the waveguides 20 and 22 arranged on both sides thereof.

Figure 2:
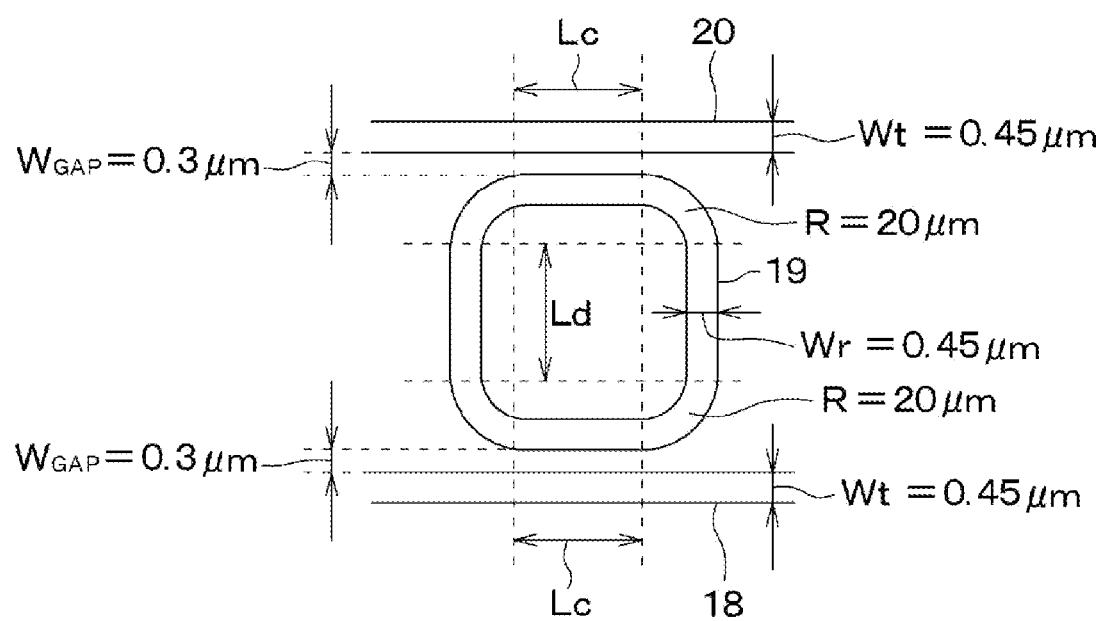

As shown in FIG. 2, the waveguides 18 and 20 have the same width Wt. Here, the width Wt is set to 0.45 μm. The ring resonator 19 is formed in a rectangular shape whose four corners are quadrants, and has a width Wr of 0.45 μm, which is the same as the width Wt. A linear portion of the ring resonator 19 facing the waveguide 18 and the waveguide 20 is mainly optically coupled with the waveguide 18 and the waveguide 20, and the length of the facing portion is designated as a coupling length Lc. A portion of the ring resonator 19 that is perpendicular to the linear portion facing the waveguide 18 and the waveguide 20 has a length Ld. The radius of curvature R of the quadrant is, for example, 20 μm. A peripheral length Lring of the ring resonator 19 is 2×Lc+ 2×Ld+2πR, and is set by adjusting the coupling length Lc and the length Ld.

The coupling length Lc is set in consideration of a coupling efficiency κ with the waveguide 18 and the waveguide 20. That is, the coupling efficiency κ can be designed by (i) the coupling length Lc, (ii) an inter-waveguide gap $W_{GAP}$ between the ring resonator 19 and the waveguide 18 or waveguide 20, and the widths Wr and Wt of the waveguides 18, 20 and the resonator 19. The coupling between the ring resonator 19 and the waveguide 18 and the coupling between the ring resonator 19 and the waveguide 20 may have different coupling efficiencies κ, but may also have the same coupling efficiency κ. Here, the widths Wt of the waveguides 18 and 20 are made equal, and the inter-waveguide gap $W_{GAP}$ is also made equal to 0.3 μm for both of the waveguides 18 and 20.

The ring resonator 19 and the ring resonator 21 are configured to have different peripheral lengths, and generate transmission spectra with different FSRs. The peripheral lengths Lring of the rings in the ring resonator 19 and the ring resonator 21 are 149.6 μm and 159.3 μm, respectively. The coupling efficiency κ between the ring resonator 19 or the ring resonator 21 and the waveguide 18 or the like is set to 0.13, and the coupling length Lc is set to 9 μm.

Figure 3:
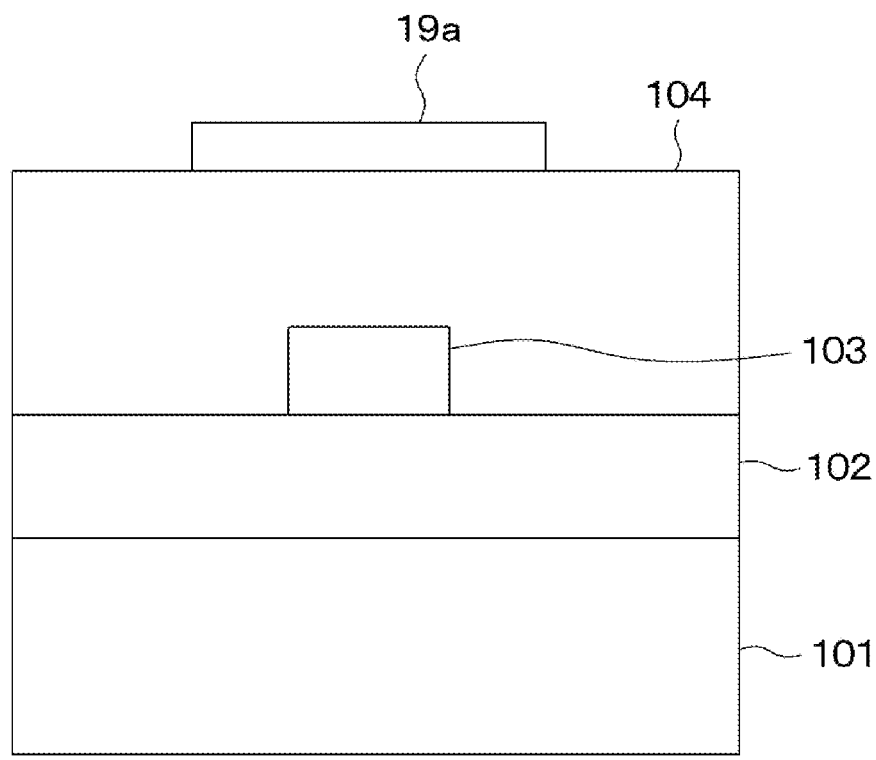
FIG. 3 is a cross-sectional view of the ring resonator.

As shown in FIG. 3, the ring resonator 19 is constructed by laminating a support substrate 101, an under-cladding layer 102, a core layer 103, an over-cladding layer 104, and a heater 19a.

The support substrate 101 is made of a silicon substrate or the like, and has a thickness of 725 μm. The under-cladding layer 102 is composed of an insulating film such as a silicon oxide film (SiO2), and is formed as a film with a thickness of 2 μm on the support substrate 101. The core layer 103 is a portion that constitutes the waveguide of the ring resonator 19, is made of silicon or the like, and is patterned so that the top surface thereof has the shape of the ring resonator 19. The width of the core layer 103 corresponds to the width Wr of the ring resonator 19, which is 0.45 μm, and the thickness is 0.22 μm. The over-cladding layer 104 is composed of an insulating film such as SiO2, and is formed with a thickness of 3 μm to cover the core layer 103. The heater 19a is formed on the over-cladding layer 104 at a position corresponding to the core layer 103 with a thickness of 0.12 μm. The heater 19a is made of a heat-generating material such as Ta, TiN, or TaN, which can heat the core layer 103 by energization.

Although the cross-sectional structure of the ring resonator 19 has been described above, the ring resonator 21 also has the same structure. Further, the waveguide 18, the waveguide 20, and the waveguide 22 are also basically configured to have the cross-sectional configuration of FIG. 3, from which the heater 19a is removed. Further, an SOI (abbreviation for Silicon On Insulator) substrate is used as the support substrate 101, the under-cladding layer 102 and the core layer 103, and the core layer 103 is formed by patterning an active layer of the SOI substrate.

The waveguide 22 propagates the light reflected by the semi-reflective mirror 24 out of the internally-emitted light propagated from the ring resonator 21 back to the ring resonator 21. As shown in FIG. 1, one end of the waveguide 22 is connected to the semi-reflective mirror 24, and the other end of the waveguide 22 is provided with a terminator 22a. The terminator 22a emits unnecessary light propagated from the waveguide 22 to the outside of the waveguide 22. The terminator 22a extends in a direction inclined at a predetermined angle with respect to the longitudinal direction of the waveguide 22 and has a tapered shape to suppress unnecessary light from being reflected and propagated back to the waveguide again. The frequency modulator 23 is arranged at a position between a portion of the waveguide 22 connected to the ring resonator 21 and an end portion of the waveguide 22 close to the semi-reflective mirror 24.

The frequency modulator 23 modulates the frequency of light passing through the waveguide 22. The frequency modulator 23 is composed of a phase modulator using, for example, a thermo-optical effect, a carrier plasma effect, an electro-optical effect, and the like, and modulates the frequency by modulating the phase of light.

Figure 4:
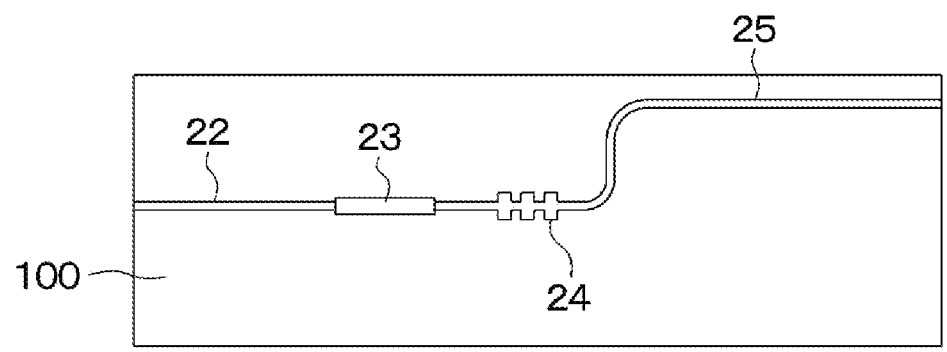
FIG. 4 is a diagram showing a configuration of a semi-reflective mirror.

The semi-reflective mirror 24 reflects a part of the light propagated from the waveguide 22, and propagates the light back to the waveguide 22, and outputs the rest of the light to the outside of the external resonance laser 11. The semi-reflective mirror 24 is composed of a directional coupler, as shown in FIG. 1, for example. In addition, as shown in FIG. 4, the semi-reflective mirror 24 may be composed of a DBR (Distributed Bragg Reflector). The reflectance of the semi-reflective mirror 24 is, for example, approximately 1 to 10%. The semi-reflective mirror 24 is connected to the wavelength monitor 12 and the transmission antenna 13 by the waveguide 25 having a line shape and in parallel with the waveguide 22 and the like, and the light output from the external resonance laser 11 propagates to the wavelength monitor 12 and the transmission antenna 13.

The wavelength monitor 12 detects a wavelength of the light output from the external resonance laser 11 in order to feedback-control the wavelength of the light output from the external resonance laser 11. The wavelength monitor 12 is composed of a filter, such as an etalon filter or the like, which has peaks at certain wavelength intervals, and a photodiode. The results of monitoring by the wavelength monitor 12 are input to a control circuit (not shown), and the temperatures of the heaters 19a and 21a provided in the ring resonators 19 and 21 are adjusted based on these monitoring results.

The transmission antenna 13 transmits the light output from the external resonance laser 11 to the outside of the optical transceiver. The transmission antenna 13 is composed of a grating coupler, and emits the light propagated from the semi-reflective mirror 24 as a laser beam within a scanning range corresponding to the wavelength.

As described above, in the transmitter 1a, light propagates as indicated by an arrow A1 in FIG. 1, and is emitted to the outside of the optical transceiver. By changing the wavelength of the light input to the transmission antenna 13 via the temperature adjustment of the heaters 19a and 21a provided in the ring resonator 19 and the ring resonator 21 of the wavelength tunable filter 26, an emission angle θ1 of light from the transmission antenna 13 is changed, and the light is scanned. When the optical transceiver is used as an FMCW LiDAR, the frequency of the transmitted light is modulated into a triangular wave shape, and the reference light and the received light separated from the transmitted light are combined to generate the beat light, and a distance measurement is performed based on such beat light. In such case, the wavelength tunable filter 26 performs modulation of the transmission light for scanning, and at the same time, the frequency modulator 23 performs modulation of the frequency into a triangular wave shape for FMCW distance measurement. However, since the modulation for FMCW distance measurement is much smaller than the modulation for scanning, the effects on scanning accuracy are small.

The transmitter 1b includes an external resonance laser 31 as a light source, a wavelength monitor 32 and a transmission antenna 33. The external resonance laser 31 includes an SOA 34 and an external resonator 35. The wavelength monitor 32, the transmission antenna 33, and the external resonator 35 are formed by subjecting the same semiconductor substrate 100 as the external resonator 15 and the like to semiconductor processing, and the SOA 34 is connected to the semiconductor substrate 100. The wavelength monitor 32 and the transmission antenna 33 have the same configurations as the wavelength monitor 12 and the transmission antenna 13 of the transmitter 1a. The external resonance laser 31 is configured to emit the internally-emitted light from the SOA 34 to the external resonator 35, extract the light as intense light in a resonant state in the external resonator 35 and the SOA 34, and output the light as externally-emitted light. In the transmitter 1b, light propagates as indicated by an arrow A2, and is emitted to the outside of the optical transceiver.

The SOA 34 has the same configuration as the SOA 14, and has a total reflection mirror 36 on an end surface opposite to the end surface connected to the semiconductor substrate 100. The external resonator 35 includes an SSC 37, a waveguide 38, a ring resonator 39, a waveguide 40, a ring resonator 41, a waveguide 42, a frequency modulator 43, a semi-reflective mirror 44 and a waveguide 45. The SSC 37 to the waveguide 45 have substantially the same configuration as the SSC 17 to the waveguide 25 of the external resonator 15, but differ in the following points.

The waveguide 38 is provided with a terminator 38a at an end portion opposite to the SSC 37, so that unnecessary light is emitted to the outside, similarly to the terminator 22a of the waveguide 22. The waveguide 40 is provided with terminators 40a and 40b at both ends so that unnecessary light is emitted to the outside. The ring resonator 39 and the ring resonator 41 are configured such that the transmission spectra overlap at the wavelength $\lambda 2$ different from $\lambda 1$, resulting in the first peak highest among the peaks. The ring resonator 39 and the ring resonator 41 are provided with a heater 39a and a heater 41a. Heating by the heater 39a and the heater 41a allows intentional change of the FSR of the transmission spectrum. Thus, the ring resonator 39, the waveguide 40 and the ring resonator 41 constitute the wavelength tunable filter 46.

The peripheral lengths Lring of the rings of the ring resonator 39 and the ring resonator 41 are 153.1 μm and 163.1 μm, respectively. The coupling efficiency κ between the ring resonators 39 and 41 and the waveguide 38 and the like is set to and the coupling length Lc is set to 9 μm.

In the present embodiment, $\lambda 1=1540$ nm, and $\zeta 2=1560$ nm. For example, when the emission angles from the transmission antennas 13 and 33 are configured to change by 0.15 degrees when the wavelength changes by 1 nm, a difference between the emission angles of the light from the transmitters 1a and 1b is about 3 degrees.

Figure 5:
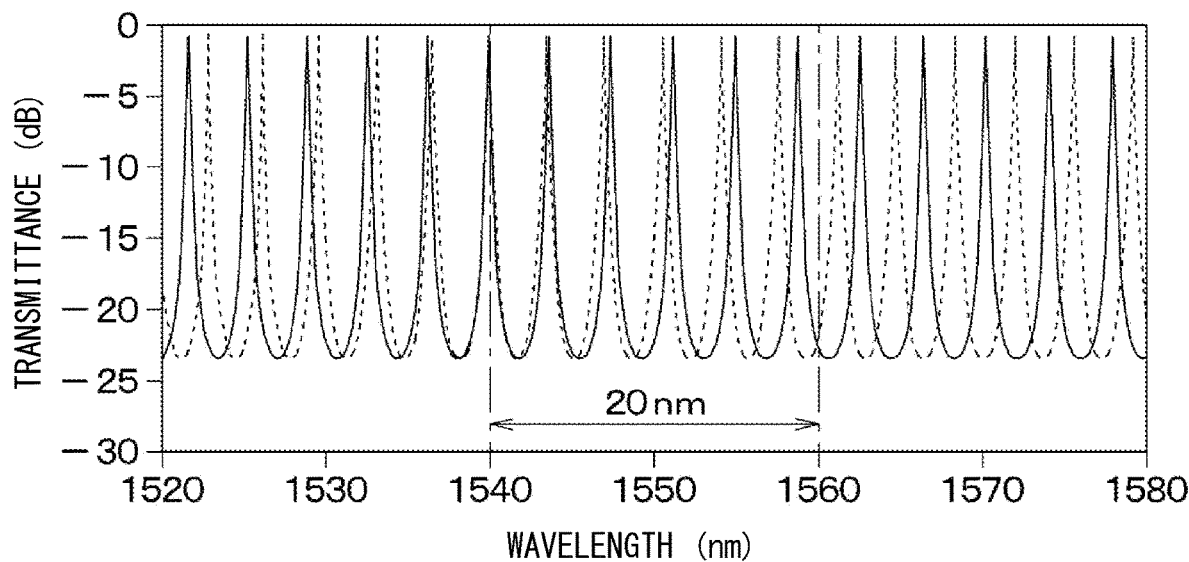
FIG. 5 is a transmission spectrum of the ring resonator.
Figure 6:
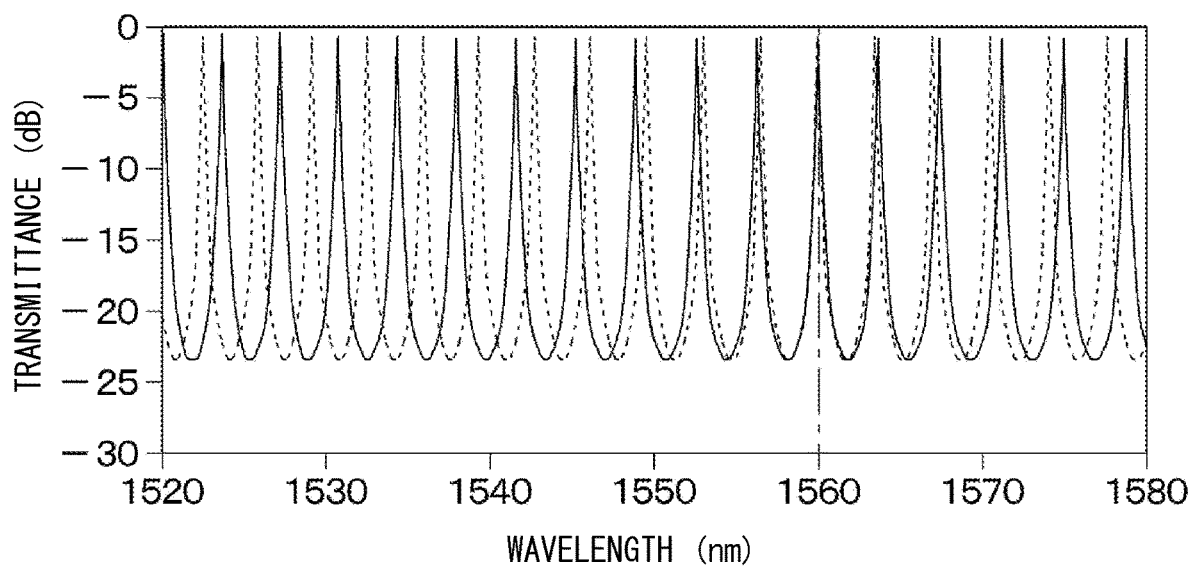
FIG. 6 is another transmission spectrum of the ring resonator.

In FIG. 5, a solid line and a broken line indicate transmission spectra of the ring resonator 19 and the ring resonator 21, respectively. In FIG. 6, a solid line and a broken line indicate transmission spectra of the ring resonator 39 and the ring resonator 41, respectively. In FIG. 5, in both of the ring resonator 19 and the ring resonator 21, the transmittance peaks at the wavelength $\lambda 1$ and decreases at the wavelength $\lambda 2$. Further, as shown in FIG. 6, both the ring resonator 39 and the ring resonator 41 have a peak transmittance at the wavelength $\lambda 2$.

The wavelength tunable filter 46 changes the wavelength of the output light so that the light transmitted from the transmission antenna 33 scans a different range from the light transmitted from the transmission antenna 13. That is, in the wavelength tunable filter 46, the wavelength $\lambda 2$ is set such that an emission angle θ2 at the transmission antenna 33 varies in a range different from the emission angle θ1. In such manner, the laser beams of a plurality of wavelengths are simultaneously emitted from the optical transceiver, so that the laser beams can be simultaneously emitted to a plurality of scanning ranges.

The receiver 2 receives light from the outside of the optical transceiver, separately outputs the received light according to respective wavelengths. As shown in FIG. 1, the receiver 2 includes the reception antenna 51, a wavelength-separating filter 52 and the waveguide 53. The reception antenna 51 receives light from the outside, and is composed of a grating coupler.

The wavelength-separating filter 52 separates the light received by the reception antenna 51 into light having the same wavelength as light output from a part of the light sources of the plurality of light sources provided in the optical transceiver, and is composed of a ring resonator possessed by the part of the light sources. In the present embodiment, the wavelength-separating filter 52 is composed of the ring resonator 19 of the external resonance laser 11, and selects, from among the lights received by the reception antenna 51, the light having the same wavelength $\lambda 1$ as the light output from the external resonance laser 11.

Specifically, the reception antenna 51 is connected to the waveguide 20 as described above, and the light received by the reception antenna 51 propagates to the waveguide 20. The light received by the reception antenna 51 includes reflected light of the light transmitted from the transmitter 1a and the light transmitted from the transmitter 1b. That is, the received light includes light of wavelength $\lambda 1$ and light of wavelength $\lambda 2$.

The ring resonator 19 is connected to the waveguide 20, and the transmission spectrum of the ring resonator 19 is configured to transmit light of wavelength $\lambda 1$ and block light of wavelength $\lambda 2$. Therefore, of the light propagated through the waveguide 20, the light of wavelength $\lambda 1$ is transmitted through the ring resonator 19 and separated from the waveguide 20. The light of wavelength $\lambda 1$ transmitted through the ring resonator 19 propagates to the waveguide 18 connected to the ring resonator 19.

The end portion of the waveguide 18 opposite to the SSC 17 is connected to the waveguide 53. The waveguide 53 is formed in a line shape in parallel with the waveguide 18, and the connection portion between the waveguide 18 and the waveguide 53 is bent in a U shape. The end portion of the waveguide 53 opposite to the waveguide 18 extends to the end surface 100a of the semiconductor substrate 100, and the received light of wavelength $\lambda 1$ propagated to the waveguide 18 propagates through the waveguide 53 and is emitted from the end surface 100a. That is, the received light of wavelength $\lambda 1$ propagates as indicated by an arrow A3 and is emitted from the optical transceiver.

On the other hand, the light of wavelength $\lambda 2$ is blocked from the ring resonator 19 and propagates through the waveguide 20. The ring resonator 21 is also connected to the waveguide 20. Notably, the transmission spectrum of the waveguide 20 is configured to block the light of wavelength $\lambda 2$. Therefore, the received light of wavelength $\lambda 2$ continues to propagate through the waveguide 20, and is emitted from the end surface 100a. That is, the received light of wavelength $\lambda 2$ propagates as indicated by an arrow A4, and is emitted from the optical transceiver.

In such manner, the ring resonator 19 constituting the wavelength-separating filter 52 separates the light of wavelengths $\lambda 1$ from the light of wavelengths $\lambda 2$, and outputs the light to the outside of the optical transceiver. An optical detector (not shown) is provided outside the optical transceiver, and distance measurement and the like are performed based on the reception results of the light beams of wavelengths λ1 and λ2.

Figure 7:
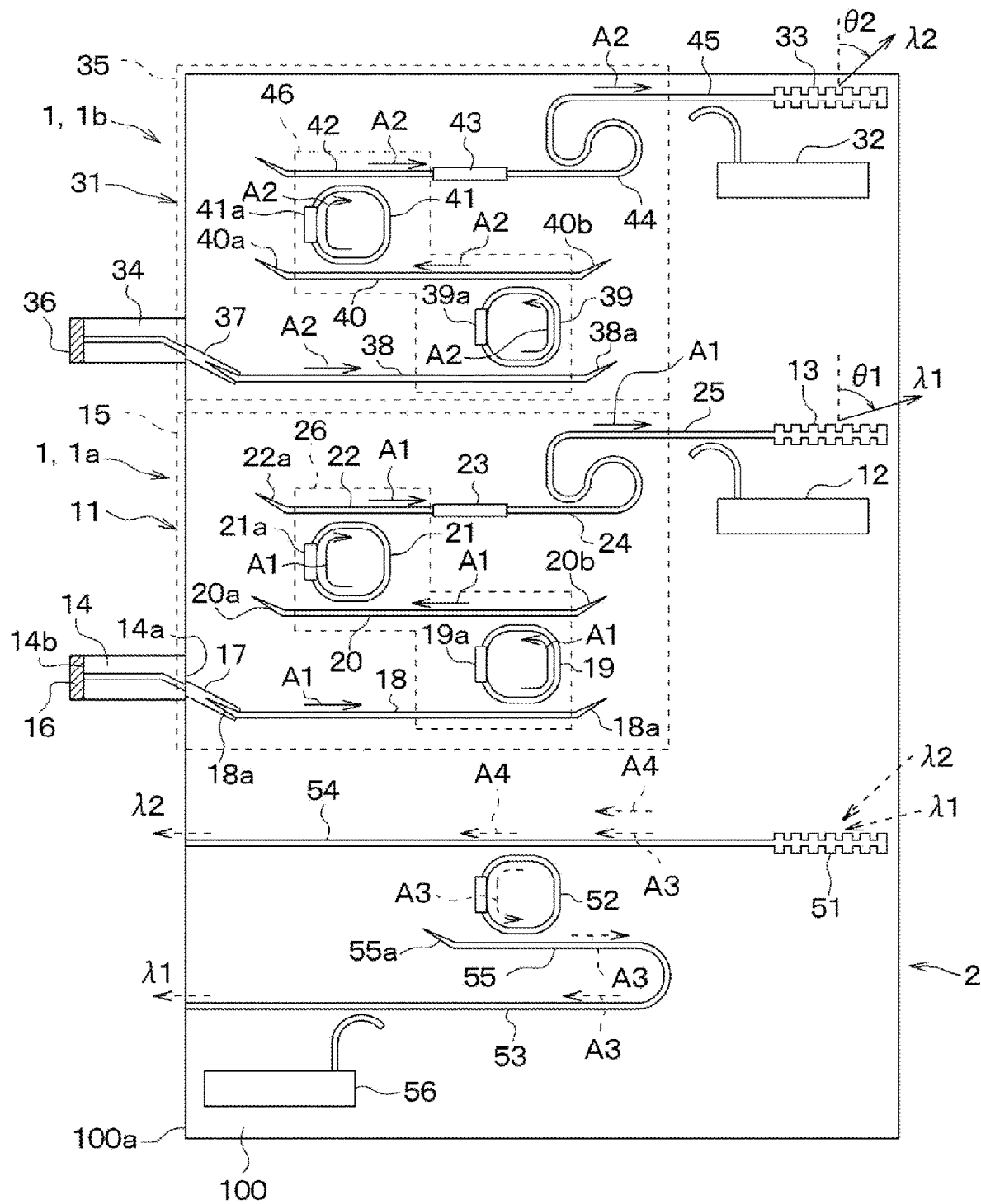
FIG. 7 is a diagram showing a schematic configuration of a comparative example.

A comparative example will be described. In the comparative example shown in FIG. 7, the external resonance laser 11 and the wavelength-separating filter 52 are provided separately. Specifically, the end portion of the waveguide 18 opposite to the SSC 17 and both ends of the waveguide 20 are provided with terminators 18a, 20a, and 20b. The receiver 2 includes a waveguide 54, a waveguide 55 and a wavelength monitor 56 in addition to the reception antenna 51, a wavelength-separating filter 52 and the waveguide 53.

The waveguide 54 is formed in a line shape in parallel with the waveguide 53. One end portion of waveguide 54 is connected to the reception antenna 51, and the other end portion extends to the end surface 100a of the semiconductor substrate 100. The waveguide 55 is formed in a line shape in parallel with the waveguide 54. The wavelength-separating filter 52 is composed of a ring resonator arranged at a position between the waveguides 54 and 55, and is optically coupled to the waveguides 54 and 55. The wavelength-separating filter 52 has a heater similarly to the ring resonator 19, and its transmission spectrum is adjusted to transmit light of wavelength λ1 and block light of wavelength λ2.

One end portion of the waveguide 55 is provided with a terminator 55a and the other end portion of the waveguide 55 is connected to the waveguide 53. The end portion of the waveguide 53 opposite to the waveguide 55 extends to the end surface 100a of the semiconductor substrate 100. The wavelength monitor 56 is connected to the waveguide 53, and the wavelength of light propagating through the waveguide 53 is detected by the wavelength monitor 56. The temperature of the heater of the wavelength-separating filter 52 is set based on the monitoring result by the wavelength monitor 56, and the transmission spectrum of the wavelength-separating filter 52 is adjusted.

In the comparative example having such a configuration, the wavelength of the light output from the external resonance laser 11 is controlled using the monitoring result of the wavelength monitor 12, and the wavelength of light output from the external resonance laser 31 is controlled using the monitoring result of the wavelength monitor 32. Further, the wavelength of the light that passes through the wavelength-separating filter 52 is controlled using the monitoring results of the wavelength monitor 56. Then, by setting the transmission wavelength of the wavelength-separating filter 52 to λ1, the light of wavelength λ1 contained in the received light is separated by the wavelength-separating filter 52. Thereby, the reflected light of wavelength λ1 transmitted from the transmitter 1a and the reflected light of wavelength λ2 transmitted from the transmitter 1b are separately detectable.

Thus, in the optical transceiver in which the external resonance laser 11 and the wavelength-separating filter 52 are separately provided, it is necessary to control the transmission wavelength of the wavelength-separating filter 52, in addition to controlling the wavelength of the external resonance laser 11, thereby taking a longer time to control the wavelength.

On the other hand, in the present embodiment, since the wavelength-separating filter 52 is configured by the ring resonator 19 of the external resonance laser 11, by controlling the wavelength of the output light of the external resonance laser 11, the wavelength-separating filter 52 is also controlled. Therefore, there is no need to separately control the transmission wavelength of the wavelength-separating filter 52, and the time required for wavelength control is reducible.

Further, in a case where the external resonance laser 11 and the wavelength-separating filter 52 are configured separately, an electric circuit for controlling the wavelength-separating filter 52 is required in addition to the electric circuit for controlling the ring resonator of the external resonance laser 11, thereby requiring more components and increasing costs.

On the other hand, in the present embodiment, the ring resonator 19 of the external resonance laser 11 constitutes the wavelength-separating filter 52, and the transmission wavelength of the wavelength-separating filter 52 is controllable by the same electric circuit as that for controlling the wavelength of the output light. Therefore, it is not necessary to separately prepare an electric circuit for controlling the wavelength-separating filter 52, and the cost is reducible.

Second Embodiment

The following describes the second embodiment of the present disclosure. The present embodiment is obtained by adding another transmitter 1 to the first embodiment, and is otherwise the same as the first embodiment, so only the parts different from the first embodiment is described.

Figure 8:
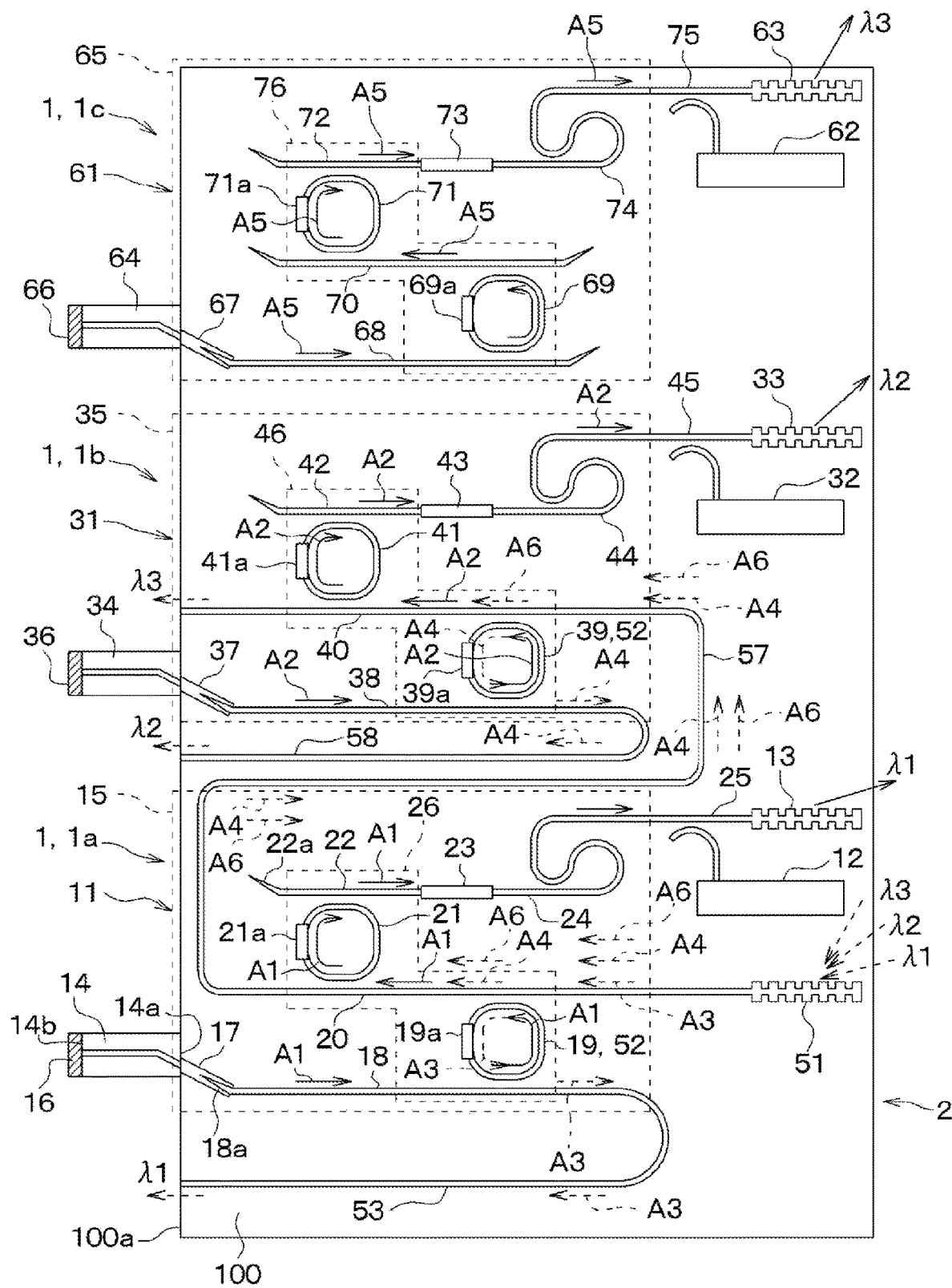
FIG. 8 is a diagram showing a schematic configuration of the optical transceiver according to a second embodiment.

As shown in FIG. 8, the optical transceiver of the present embodiment includes, as a transmitter 1, a transmitter 1c in addition to the transmitter 1a and the transmitter 1b. The transmitter 1c includes an external resonance laser 61 as a light source, a wavelength monitor 62 and a transmission antenna 63. The external resonance laser 61 has an SOA 64 and an external resonator 65. The wavelength monitor 62, the transmission antenna 63, and the external resonator 65 are formed by subjecting the same semiconductor substrate 100 as the external resonator 15 and the like to the semiconductor processing, and the SOA 64 is connected to the semiconductor substrate 100. The wavelength monitor 62 and the transmission antenna 63 have the same configurations as the wavelength monitor 12 and the transmission antenna 13 of the transmitter 1a. The external resonance laser 61 is configured to emit internally-emitted light from the SOA 64 to the external resonator 65, extract the light as intense light in a resonant state in the external resonator 65 and the SOA 64, and output the light as externally-emitted light. In the transmitter 1c, light propagates as indicated by an arrow A5, and is emitted to the outside of the optical transceiver.

The SOA 64 has the same configuration as the SOA 14, and has a total reflection mirror 66 on an end surface opposite to the end surface connected to the semiconductor substrate 100. The external resonator 65 includes an SSC 67, a waveguide 68, a ring resonator 69, a waveguide 70, a ring resonator 71, a waveguide 72, a frequency modulator 73, a semi-reflective mirror 74 and a waveguide 75. The SSC 67 to the waveguide 75 have substantially the same configuration as the SSC 37 to the waveguide 45 of the first embodiment, but differ in the following points.

The ring resonator 69 and the ring resonator 71 are configured such that the transmission spectra overlap at a wavelength λ3 different from λ1 and λ2, resulting in the first peak highest among the peaks. The ring resonator 69 and the ring resonator 71 are provided with a heater 69a and a heater 71a. Heating by the heater 69a and the heater 71a allows intentional change of the FSR of the transmission spectrum. Thus, the ring resonator 69, the waveguide 70 and the ring resonator 71 constitute a wavelength tunable filter 76. In the present embodiment, the peripheral lengths Lring of the rings of the ring resonators 19, 21, 39, 41, 69, and 71 are 149.6 µm, 160.0 µm, 153.1 µm, 163.8 µm, 156.7 µm, and 167.7 µm, respectively. The ring coupling efficiency κ of the ring resonators 19, 21, 39, 41, 69, and 71 is set to 0.13, and the coupling length Lc is set to 9 µm. $\lambda 3$ is set to 1580 nm.

Figure 9:
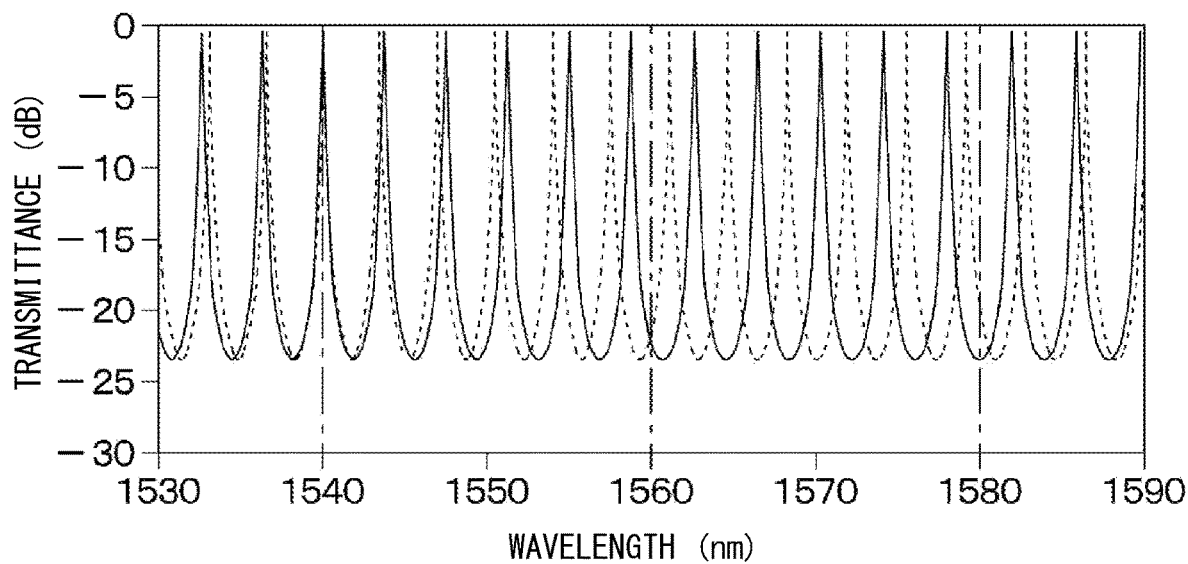
FIG. 9 is a transmission spectrum of the ring resonator.
Figure 10:
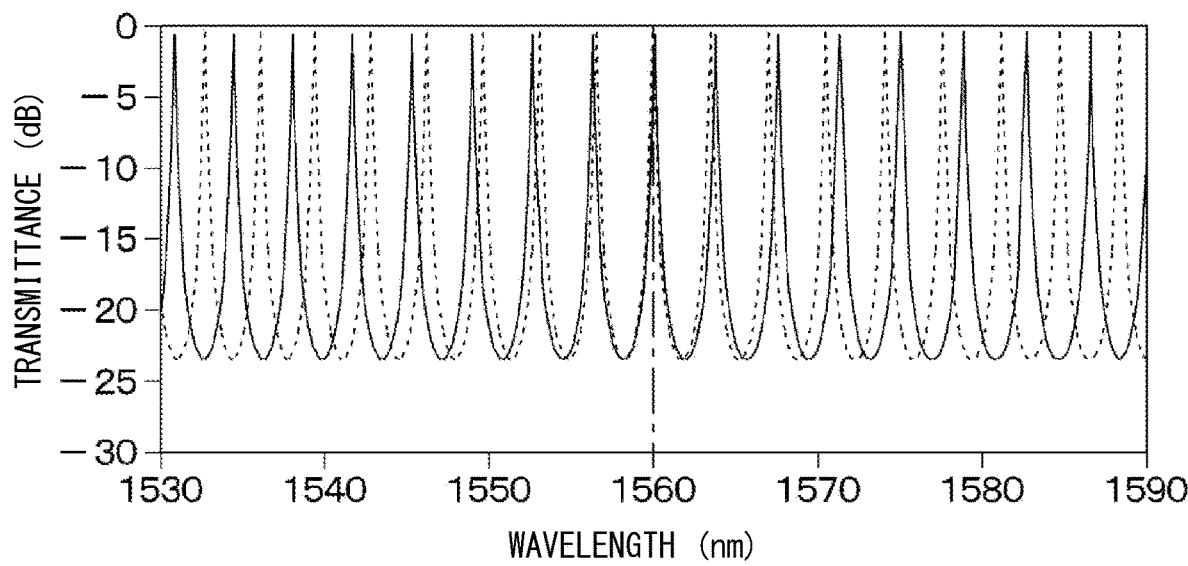
FIG. 10 is another transmission spectrum of the ring resonator.
Figure 11:
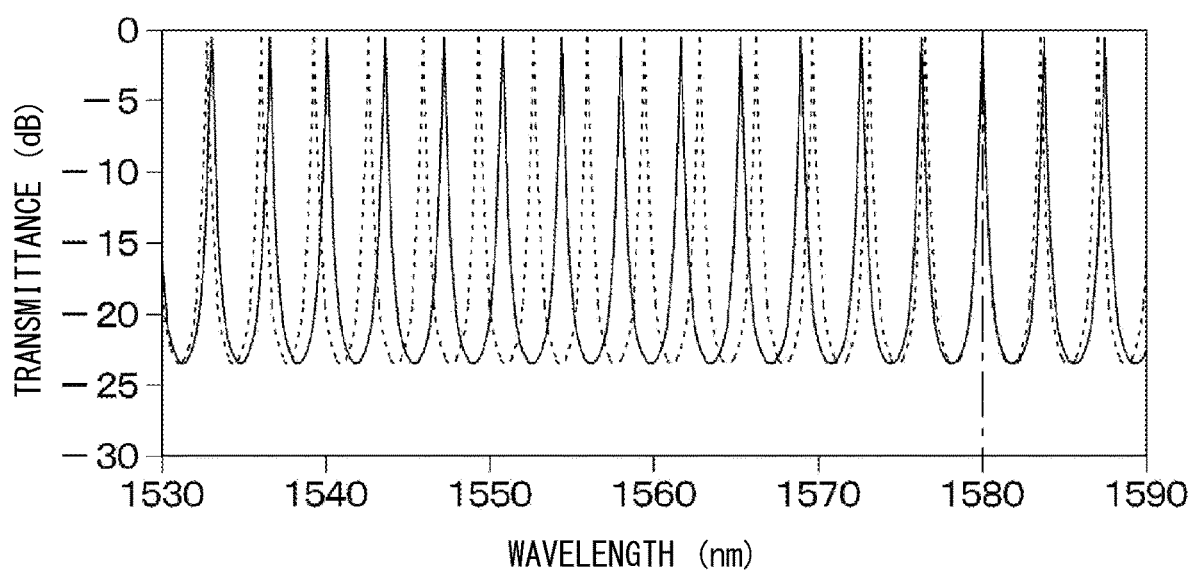
FIG. 11 is a transmission spectrum of the ring resonator.

In FIG. 9, a solid line and a broken line indicate transmission spectra of the ring resonator 19 and the ring resonator 21, respectively. In FIG. 10, a solid line and a broken line indicate transmission spectra of the ring resonators 39 and 41, respectively. In FIG. 11, solid lines and broken lines indicate transmission spectra of the ring resonators 69 and 71, respectively. As shown in FIG. 9, in both of the ring resonator 19 and the ring resonator 21, the transmittance peaks at wavelength $\lambda 1$ and decreases at wavelengths $\lambda 2$ and $\lambda 3$. Further, as shown in FIG. 10, in both of the ring resonators 39 and 41, the transmittance peaks at the wavelength $\lambda 2$ and decreases at the wavelength $\lambda 3$. Further, as shown in FIG. 11, both of the ring resonator 69 and the ring resonator 71 have a peak transmittance at the wavelength $\lambda 3$.

The wavelength tunable filter 76 changes the wavelength of the output light so that the light transmitted from the transmission antenna 63 scans a different range from the light transmitted from the transmission antennas 13 and 33. That is, in the wavelength tunable filter 76, the wavelength $\lambda 3$ is set such that an output angle θ3 at the transmission antenna 63 varies in a range different from the output angles θ1 and θ2.

The end portion of the waveguide 20 opposite to the reception antenna 51 is connected to the end portion of the waveguide 40 via a meandering waveguide 57. The waveguide 57 passes between the terminator 22a and the end surface 100a of the semiconductor substrate 100, further passes between the waveguide 22 and a waveguide 58 described later, and is connected to the end portion of the waveguide after passing through an opposite side of the end surface 100a with respect to a coupling part of the waveguide 58 and the waveguide 38. The end portion of the waveguide 40 opposite to the end portion connected to the waveguide 57 extends to the end surface 100a.

In such manner, the ring resonator 19, the ring resonator 21, the ring resonator 39, and the ring resonator 41 are connected to the waveguide extending from the reception antenna 51 in order of proximity to the reception antenna 51. The end portion of the waveguide 38 opposite to the SSC 37 is connected to the waveguide 58. The waveguide 58 is formed in a line shape in parallel with the waveguide 38, and the end portion opposite to the end portion connected to the waveguide 38 extends to the end surface 100a.

The wavelength-separating filter 52 of the present embodiment is composed of the ring resonator 19 and the ring resonator 39. Specifically, when lights with wavelengths $\lambda 1$, $\lambda 2$, and $\lambda 3$ are received by the reception antenna 51, the light of wavelength $\lambda 1$ among the received lights is separated from the waveguide 20 by the ring resonator 19 constituting the wavelength-separating filter 52, propagates through the waveguide 53, and is emitted from the end surface 100a of the semiconductor substrate 100. The remaining lights of wavelengths $\lambda 2$ and $\lambda 3$ are blocked from the ring resonator 21 and propagated from the waveguide 20 through the waveguide 57 to the waveguide 40. Of the lights propagating through the waveguide 40, the light of wavelength $\lambda 2$ is separated from the waveguide 40 by the ring resonator 39 forming the wavelength-separating filter 52, propagates through the waveguide 58, and is emitted from the end surface 100a. The remaining light of wavelength $\lambda 3$ is blocked from the ring resonator 41, propagates through the waveguide 40, and is emitted from the end surface 100a. In such manner, the lights of wavelengths $\lambda 1$, $\lambda 2$, and $\lambda 3$ are separated by the ring resonators 19 and 39 forming the wavelength-separating filter 52, propagate as indicated by arrows A3, A4, and A6, and are output to the outside of the optical transceiver.

In the present embodiment, the ring resonator 19 of the external resonance laser 11 and the ring resonator 39 of the external resonance laser 31 constitute the wavelength-separating filter 52. Therefore, by controlling the wavelengths of the output lights from the external resonance lasers 11 and 31, the transmission wavelength of the wavelength-separating filter 52 is also controlled.

In the present embodiment, it is possible to achieve the advantageous effects as similar to the effects in the first embodiment with the configuration and operation identical to the ones in the first embodiment.

Third Embodiment

The following describes the third embodiment of the present disclosure. The present embodiment is obtained by adding a blocker to the second embodiment, and is otherwise the same as the second embodiment, so only the parts different from the second embodiment are described.

Figure 12:
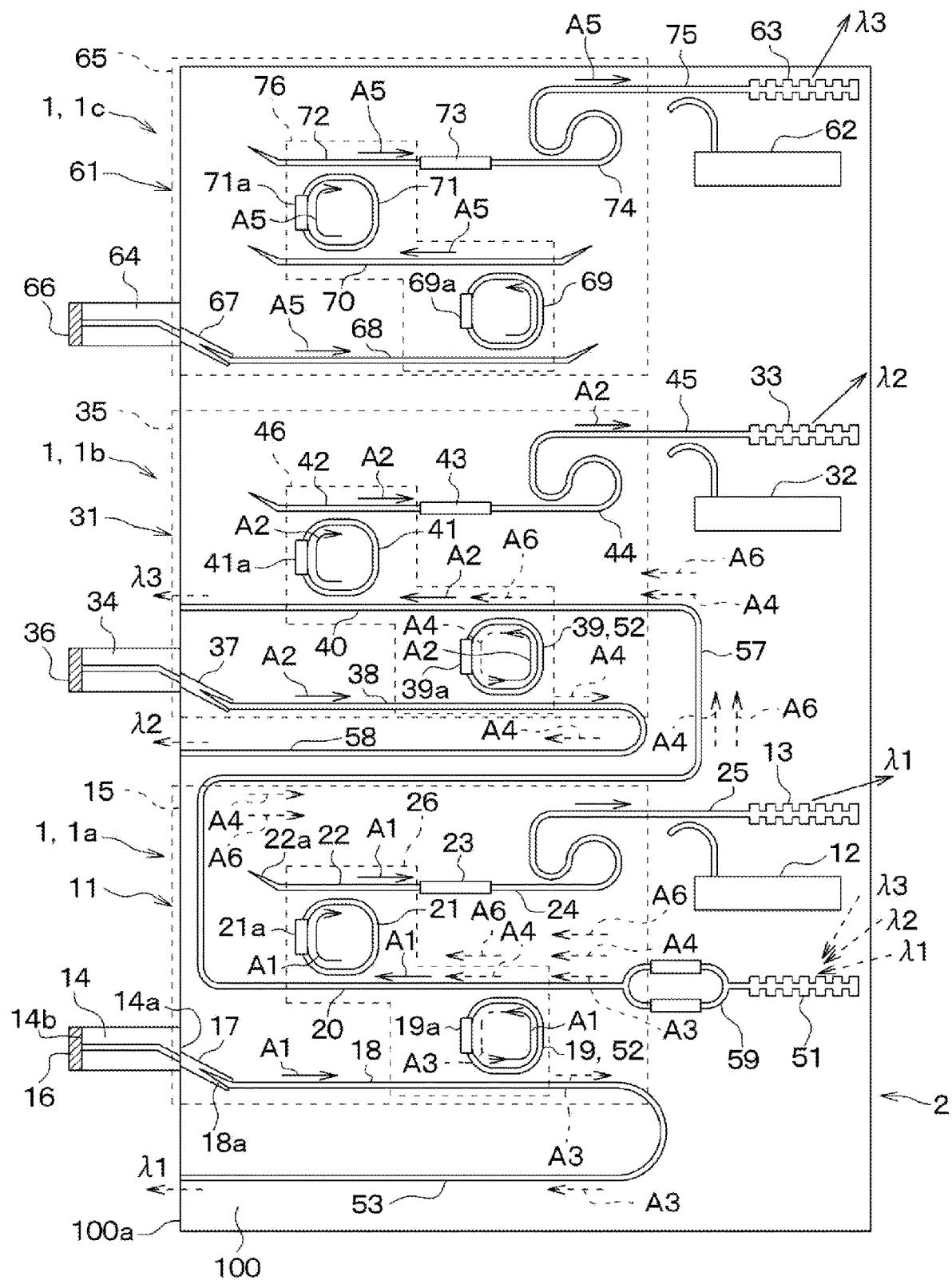
FIG. 12 is a diagram showing a schematic configuration of the optical transceiver according to a third embodiment.

As shown in FIG. 12, in the present embodiment, a blocker 59 that blocks light received by the reception antenna 51 is arranged at a position between the reception antenna 51 and the wavelength-separating filter 52. The blocker 59 is provided as, for example, an MZI (Mach-Zehnder Interferometer) type optical switch, VOA (variable Optical Attenuator), or the like.

FIG. 12 illustrates a case where the blocker 59 is configured by an MZI type optical switch. In the blocker 59 having such a configuration, the received light is divided into two paths and propagated, and the heater adjusts the optical path length of each path to change the phase of the light propagating in one path to the phase of the light propagating in the other path, thereby reversing the phase of the two and multiplexing the intensity of light in the two paths to zero. Thereby, it is possible to prevent the received light from entering the external resonator 15.

When the blocker 59 is provided as a VOA, it is possible to suppress the entry of the received light into the external resonator 15 by attenuating the received light significantly.

In the present embodiment, it is possible to achieve the advantageous effects as similar to the effects in the first and second embodiments with the configuration and operation identical to the ones in the first and second embodiments.

Further, according to the embodiments described above, it is possible to achieve the following advantageous effects.
(1) At a position between the reception antenna 51 and the wavelength-separating filter 52, the blocker 59 is arranged to block the light received by the reception antenna 51. According to the above, by blocking the received light with the blocker 59 during the wavelength control of the external resonance laser 11, unnecessary light can be suppressed from entering the ring resonator 19, and stable wavelength control is performable.

Other Embodiments

The present disclosure is not limited to the embodiments described above, and can be appropriately modified within the present disclosure. Each of the above embodiments, which are relevant to each other, is combinable to the other one unless such combination is clearly difficult. Further, individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. A shape, positional relationship or the like of a structural element, which is referred to in the embodiments described above, is not limited to the described shape, positional relationship or the like, unless it is specifically described or obviously necessary to be limited in principle.

(1) In the first embodiment, the blocker 59 may be arranged at a position between the reception antenna 51 and the wavelength-separating filter 52.

(2) In the second and third embodiments, the semi-reflective mirrors 24, 44 and 74 may be composed of DBRs.

(3) Light of four or more wavelengths may be transmitted from the optical transceiver. Assuming that the number of external resonance lasers as light sources is M, the wavelength-separating filter 52 is configured as follows.

K is an integer of 1 or more and M or less, $\lambda K$ is the wavelength of light output from the Kth light source among the plurality of light sources, N is an integer of 1 or more and M−1 or less, and L is an integer of N+1 or more and M or less. The Nth light source among the plurality of light sources has two ring resonators that transmit light of wavelength $\lambda N$, and the wavelength-separating filter 52 selects one of the two ring resonators of the Nth light source to separate light of wavelength $\lambda N$.

The two ring resonators of the Nth light source are connected in order to waveguides extending from the reception antenna 51. Among the two ring resonators of the Nth light source, one ring resonator closer to the reception antenna 51 is configured to separate light from the waveguide when the light having the wavelength $\lambda N$ is input to the resonator and has passed therethrough. The other ring resonator is configured to, when light of wavelength $\lambda L$ is input, block the light from the ring resonator and propagates through the waveguides.

(4) The optical transceivers described in the first to third embodiments are the examples in which one semiconductor substrate 100 is provided. However, it is also possible to provide a plurality of sets of optical transceivers on one semiconductor substrate 100, with the plurality of sets of the optical transceiver configured as the ones described in the respective embodiments. In such case, any combination may be used. For example, the plurality of sets of the optical transceivers may include the ones shown in the first embodiment, or may mix the optical transceivers shown in the first embodiment and the second embodiment.

What is claimed is:

1. An optical transceiver comprising:
a plurality of light sources having a ring resonator;
a reception antenna configured to receive light; and
a wavelength-separating filter configured to separate, from among the light received by the reception antenna, light of a same wavelength as light output from a part of the plurality of light sources,
wherein
the wavelength-separating filter is composed of the ring resonator included in the part of the plurality of light sources, and
M is a number of the plurality of light sources,
K is an integer that satisfies $1 \leq K \leq M$,
$\lambda K$ is a wavelength of light output from a Kth light source among the plurality of light sources,
N is an integer that satisfies $1 \leq N \leq M-1$,
an Nth light source among the plurality of light sources includes two ring resonators, which includes the ring resonator, configured to transmit light of a wavelength $\lambda N$, and
the wavelength-separating filter is configured to separate the light of the wavelength $\lambda N$ using one of the two ring resonators of the Nth light source.

2. The optical transceiver according to claim 1, wherein L is an integer that satisfies $N+1 \leq L \leq M$,
the two ring resonators of the Nth light source are connected in order to a waveguide extending from the reception antenna,
among the two ring resonators included in the Nth light source, one of the ring resonators closer to the reception antenna is configured to, when receiving the light of the wavelength $\lambda N$, separate the light from the waveguide, and
an other of the ring resonators is configured to, when receiving the light of a wavelength $\lambda L$, block the light from the one of the ring resonators and propagate the light through the waveguide.

3. An optical transceiver comprising:
a plurality of light sources having a ring resonator;
a reception antenna configured to receive light; and
a wavelength-separating filter configured to separate, from among the light received by the reception antenna, light of a same wavelength as light output from a part of the plurality of light sources; and
a blocker provided between the reception antenna and the wavelength-separating filter to block the light received by the reception antenna,
wherein
the wavelength-separating filter is composed of the ring resonator included in the part of the plurality of light sources.

* * * * *